United States Patent [19]

Zinn et al.

[11] 4,176,654
[45] Dec. 4, 1979

[54] SOLAR HEATING APPARATUS

[75] Inventors: Michael F. Zinn; Steven E. Krulick, both of Spring Glen, N.Y.

[73] Assignee: Bio-Energy Systems, Inc., Spring Glen, N.Y.

[21] Appl. No.: 816,883

[22] Filed: Jul. 18, 1977

[51] Int. Cl.² .................. F24J 3/02; F28F 1/32
[52] U.S. Cl. .................. 126/448; 165/171; 264/274
[58] Field of Search .......... 126/270, 271; 165/171; 52/389, 403; 29/157.3 C; 264/259, 274; 428/40

[56] References Cited

U.S. PATENT DOCUMENTS

| | | | |
|---|---|---|---|
| 2,976,972 | 3/1961 | Raymond | 52/717 |
| 3,533,896 | 10/1970 | Hartig | 264/274 |
| 3,859,980 | 1/1975 | Crawford | 126/271 |
| 3,886,998 | 6/1975 | Rowekamp | 126/271 |
| 3,968,608 | 7/1976 | Swango | 52/403 |
| 3,999,536 | 12/1976 | Bauer et al. | 126/271 |
| 4,018,211 | 4/1977 | Barr | 126/270 |
| 4,048,981 | 9/1977 | Hobbs | 126/271 |
| 4,052,000 | 10/1977 | Honikman | 126/271 |
| 4,060,070 | 11/1977 | Harter | 126/271 |
| 4,094,301 | 6/1978 | Sorenson et al. | 126/271 |
| 4,120,288 | 10/1978 | Barrett | 126/271 |
| 4,124,676 | 11/1978 | Henzl | 264/274 |

FOREIGN PATENT DOCUMENTS 562997  5/1957  Italy ....................... 264/274

Primary Examiner—John J. Vrablik
Attorney, Agent, or Firm—Charles J. Brown

[57] ABSTRACT

A solar collector simple to install in the field comprises a mat formed of side-by-side extruded EPDM rubber strips having parallel hollow tubes, with inwardly diverging recesses extending along the strips so that the strips can be removably adhered to an insulating base without cement protruding above the tubes. A one-piece extrusion seals an edge of upper light transmissive panel, covers a side of the collector and seals the collector atop a roof or like surface.

31 Claims, 9 Drawing Figures

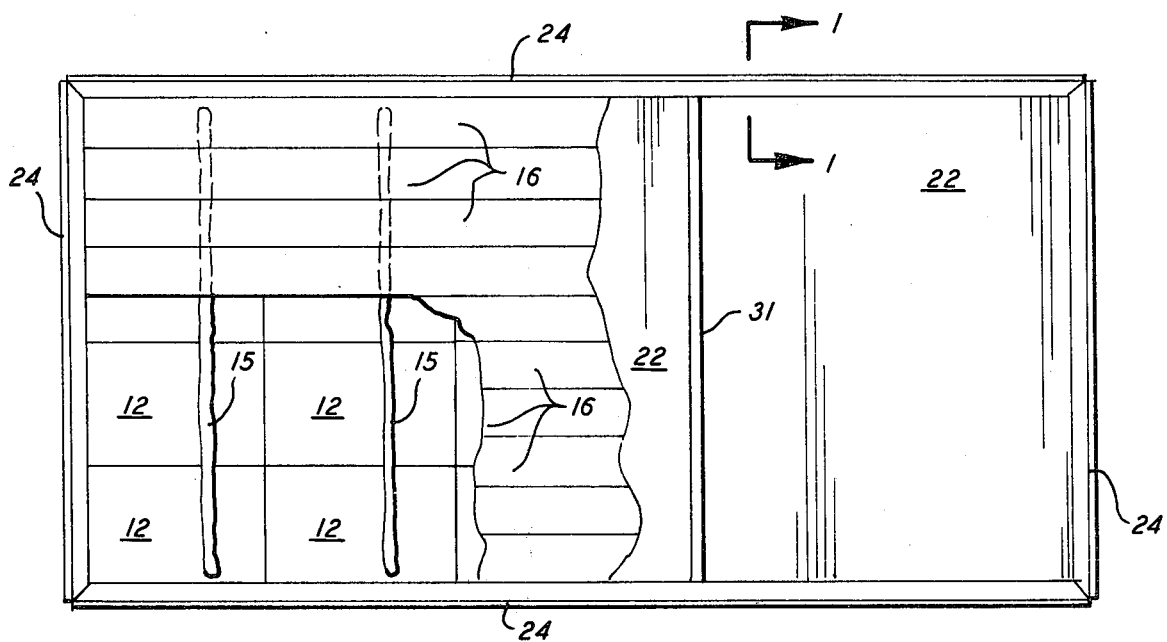
FIG. 3
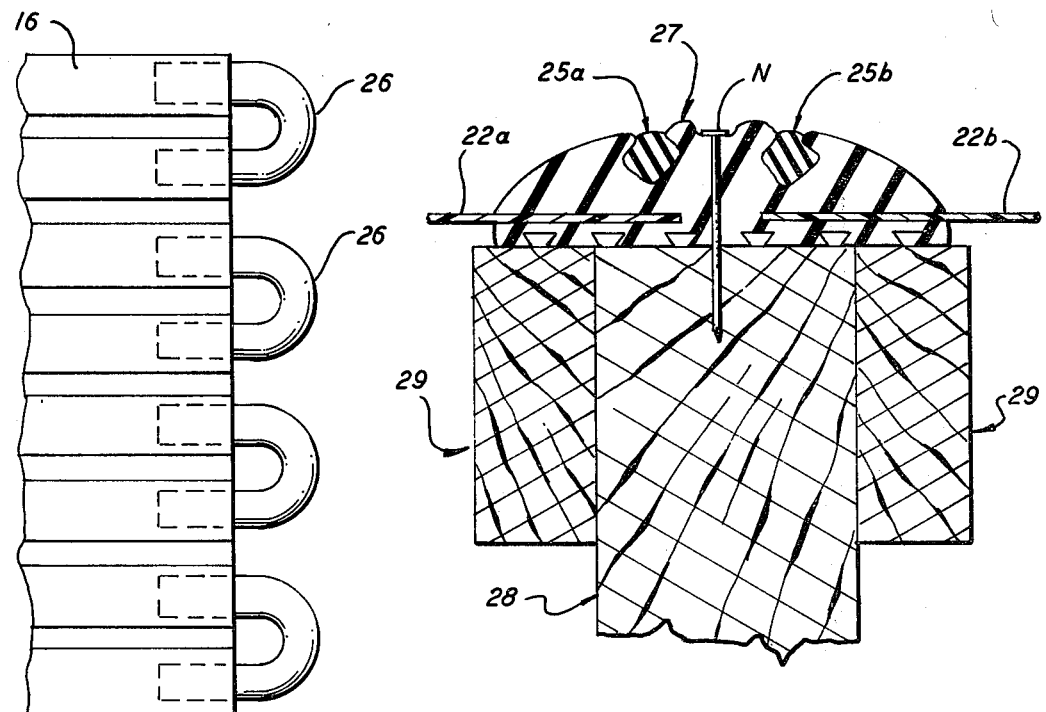
FIG. 4
FIG. 6b

SOLAR HEATING APPARATUS

SUMMARY OF INVENTION

Our invention relates to solar collectors, and more particularly to solar water heaters of the type typically used on roof tops of residences to heat water for domestic use, building heating, swimming pools or the like. During the last several years a wide variety of solar water heaters have been proposed, but most of them have been expensive to construct or install, and many of them have had limited life when used in adverse environments. One broad object of the present invention is to overcome such disadvantages.

Attempts have been made to decrease the cost of solar collectors by use of pre-fabrication, or factory construction of as many collector parts as is reasonably possible. While factory construction of collectors or collector parts in predetermined sizes tends to reduce overall costs in some cases, it instead increases the overall costs in some instances, requiring that plural such collectors be installed on a given roof and interconnected by plumbing connections in order to provide adequate heating capacity. Inasmuch as ambient sunlight and other climate conditions vary widely in different locations, and an extremely wide variety of roof shapes, slopes and sizes are used, it is apparent that an extremely large number of different sizes of solar collector would have to be factory-made and stocked in order to approach provision of an ideal size collector for any of the millions of residences where solar water heating would be practical and helpful in overcoming the national energy shortage. Some solar collectors, if factory-made in a desired size, would be expensive or difficult to transport and to install. Factory prefabrication of most prior collectors in reasonably sized sections or modules which could be fitted together in the field to form a collector of desired size tends not to be an acceptable solution, since one then must very carefully seal the joints between the separate sections. One object of the present invention is to provide an improved solar collector in which certain important parts may be factory-made at low cost, but made in such a form that a solar collector approaching an ideal or desired size can be readily and inexpensively installed in the field with a minimum number of joints to seal.

Despite greatly increased usage of solar collectors being in the national interest, it is known that the large cost of such collectors deters many prospective users from purchasing such devices. One object of the present invention is to provide an improved solar collector which may be readily installed by the average "do-it-yourselfer", at much less cost than prior solar collectors.

Some homeowners are reluctant to install solar collectors for aesthetic reasons, and more specifically because the appearance of some solar collectors tends to detract from the appearance of a house. A further object of the present invention is to provide an improved solar collector which may be easily installed to present a neat, workmanlike appearance.

Most solar collectors installed on rooftops or in similar locations are subject to appreciable wind loading. In many locations they are also subject to appreciable snow or ice loading, and they are ordinarily subject to substantial temperature changes, moisture and adverse weather conditions. Collectors insulated with polyurethane foam, polystyrene foam, or fiberglass require protective enclosures, typically made of either aluminum or wood. Aluminum enclosures are expensive, as well as difficult to tailor-make in the field to fit a desired size of collector, while wood is not very durable, tending to rot in many applications. A further object of the present invention is to provide an improved solar collector which will readily withstand wind, snow and ice loading. Another object of the present invention is to provide an improved solar collector which is inexpensive and easily installed in the field without a need for skilled labor or the use of special tools or equipment, and which is durable and long-lasting in the face of adverse weather conditions.

One attempt to overcome some of the abovementioned problems of the prior art involves the use of a plurality of EPDM synthetic rubber tubes cemented atop a fiberglass board, with one or more layers of plastic glazing spaced thereabove. A group of say sixty-four rubber tubes extending parallel to each other are fastened together every several feet to form a wide plural-tube roll several feet wide, which may be furnished in a long roll or carried on a reel. Lengths of the roll may be cut to a desired length by clipping all the tubes and then laid side-by-side on the fiberglass board to form a collector mat. While the use of such a flexible mat of EPDM tubing and the use of flexible plastic glazing offer great advantages in allowing collectors to be made in the field to a desired size, the mentioned prior solar collector has several disadvantages which the present invention overcomes.

EPDM rubber is used because of its excellent resistance to deterioration from sunlight, ozone, oxidation and heat. While such tubing readily resists deterioration, a problem arises from the fact that cements which will not deteriorate such tubing also will not bond to such tubing, making it difficult to adhere the strips of tubing to the underlying fiberglass board. It is necessary that the strips of tubes be fastened down, or else the "memory" or "set" in the previously rolled-up tubing causes it to tend to curl, preventing formation of the flat mat desired for use as a collector. Because roofing cement will not bond to the EPDM rubber tubes themselves, construction of the prior collector has required use of a very thick layer of cement onto which the strips of tubing are pressed, so that cement oozes up between and above the tubes, and then holds the tubes in place after it hardens. Installing the prior art strips of flexible tubing has been a messy job, even when done on flat rooftops, and when such a mat is constructed on a slope, the cement tends to run, making the job even more messy and difficult. Also, it is difficult to seal the edges around such a collector unless large amounts of roofing cement are applied, and they tend to provide a messy appearance. Further, upon experiencing substantial usage, the roofing cement joints tend to leak, allowing moisture to collect in the underlying fiberglass board, decreasing insulation efficiency, and often making it necessary that the solar chamber of the collector be periodically dried out. Further, if repair of such a collector becomes necessary, the glazing must be cut away and replaced. The present invention incorporates all the advantages of using a flexible rubber mat and flexible glazing, but provides an arrangement which overcomes the mentioned disadvantages. With the invention, much smaller amounts of mastic or cement may be used to hold the tubing, and the glazing is readily removable and replaceable. Thus one more specific object of the invention is to provide an improved solar collector using a flexible rubber mat of tubing having an improved arrangement for adhering the mat in a secure yet removable manner to an underlying base surface. Another specific object of the invention is to provide an improved solar collector in which an upper glazing is easily and securely installed, yet readily removable and replaceable.

Various known forms of solar collector are time-consuming and difficult to install because they require the installation of flashing to seal the joints between the collector and the roof, they require some form of sidewall to cover and protect the edges of insulation inside the collector, and they require some form of gasket between sidewalls of the collector and a light-transmissive upper panel. One object of the invention is to provide a simple extrusion which will readily perform each of those functions, and a further object is to provide an extrusion not only having that great utility but which is also easy and simple to install in tailor-made or custom (as opposed to prefabricated) solar collectors.

Other objects of the invention will in part be obvious and will in part appear hereinafter.

The invention accordingly comprises the features of construction, combination of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which:

FIG. 3 is a plan view illustrating an exemplary collector, with certain parts removed or cutaway to better illustrate the construction of the invention.

FIG. 4 is a top view illustrating tubing connections made at one end of certain flexible tubing mats used in the invention.

FIG. 6b is a cross-section view illustrating a further form of sealing extrusion made in accordance with the invention.

Figure 1:
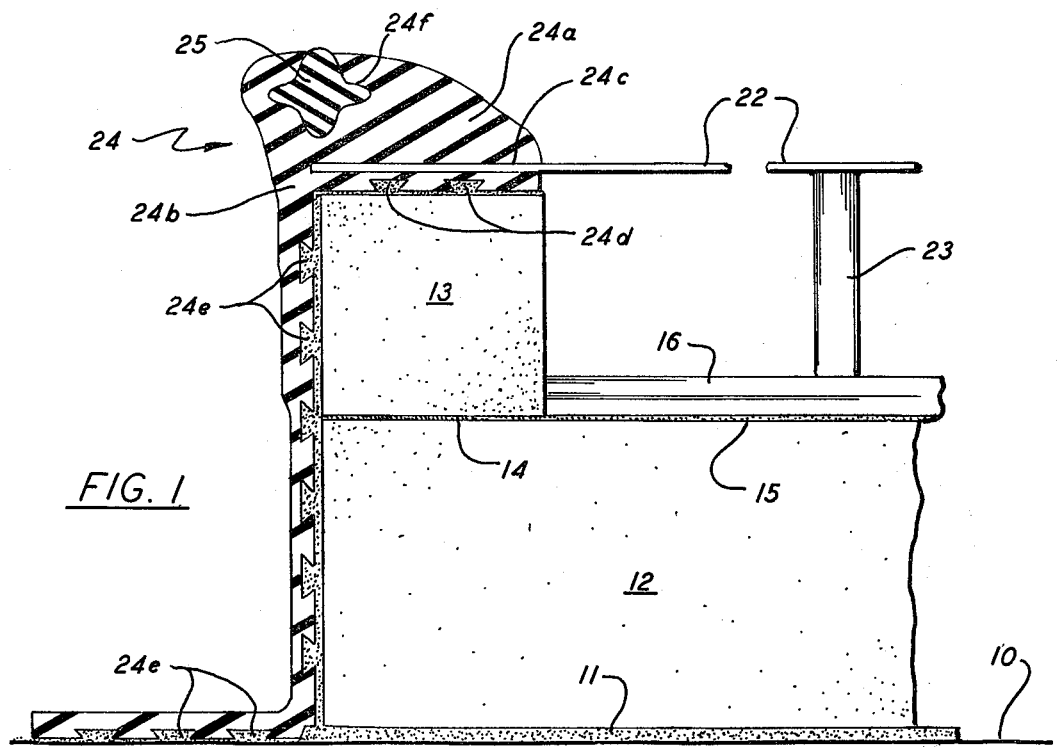
FIG. 1 is a cross-section elevational view taken at lines 1—1 in FIG. 3.

Referring to FIGS. 1-5, a typical collector constructed in accordance with the invention might be of the order of 4 or 5 feet in width, and almost any desired length, e.g. 60 feet. To appreciate the utility of the present invention one should keep in mind that rigid members which approached any such length would tend to be extremely expensive to fabricate, to ship, and to handle, and that providing such members in smaller sections which could fit together tends to provide numerous joints which would have to be sealed as well as requiring fasteners of some type. The collector shown in FIG. 3 is shown with a length merely about double its width solely for sake of drafting convenience. The width dimension is also not restricted to one or a few sizes, however, as will become clear below. In FIG. 1 numeral 10 represents a surface, such as rooftop surface, upon which the collector is mounted, and surface 10 is shown extending horizontally for sake of drafting convenience, recognizing that most roof surfaces upon which a collector will be mounted will have some slope. The surface 10 may comprise any common form of roofing, such as asphalt shingles, asphalt strip roofing, or even tiles. The collector need not be installed atop roofing, however, and may be carried on a base area of plywood, for example, or other sheeting used to carry roofing.

Construction of the collector at the roof site is begun by covering a desired area of roofing or the underlying sheeting (ordinarily a rectangular area) of the roof surface with an insulating base. The insulating base may comprise one or several sheets of insulating board nailed or otherwise affixed side by side to the roof, but in FIGS. 1 and 3 the base is assumed instead to be comprised of a plurality of blocks 12,12 affixed atop the roof surface by a layer of mastic 11. In FIG. 3 portions of strips 16,16 which cover the blocks 12 upon completion of installation have been shown cutaway to afford a view of several blocks 12. Blocks 12 each preferably comprise a block typically 1½ inches thick, and either 18×24 inches or 12×18 inches, of rigid, closed-cell glass insulation, such as the cellular glass insulation sold by Pittsburgh-Corning Corporation, Pittsburgh, Pa. under the trademark "Foamglass". Blocks of such insulation in either of the mentioned sizes obviously may be compactly packaged and shipped, and easily applied atop the layer of mastic 11 by unskilled labor without the use of any special tools. The blocks can readily be sawed in the field to accommodate different collector sizes. One suitable form of mastic 11 which may be used to adhere the blocks 12 to the surface 10 is No. 4314 construction mastic made by 3M Company. As previously suggested, other forms of insulating board, such as fiberglass or polyurethane foam brand may be used in lieu of blocks 12,12.

A raised edge is then formed around the perimeter of the insulating base layer, preferably by means of strips 13,13 (FIG. 1) of similar closed-cell glass insulation. Strips 13 are preferably adhered to blocks 12 at their outer perimeter by a layer 14 of mastic or other adhesive, common body putty of the type widely used for automobile repair work having proven suitable. Importantly, blocks 12 and strips 13 have substantial compressive strength and rigidity, and as will be seen below, that allows ready construction of a collector of desired size without pre-fabrication of any metal or wood protective frame such as most prior collectors have required, and without any need to perform metal-working or woodworking operations in the field during installation. It is within the scope of the invention, however, to provide the raised edge by nailing strips of wood (not shown) to the roof around the perimeter of the insulating base instead of using strips 13. Any such wooden strips preferably use wood which has been pressure-impregnated with a rot protective solution.

Figure 2:
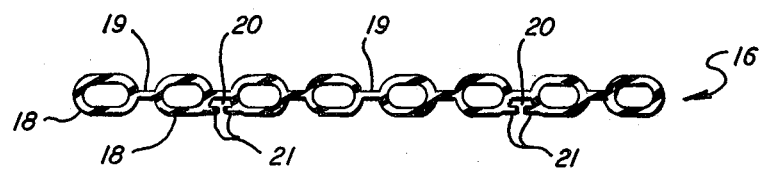
FIG. 2 is a cross section view of a flexible collector strip extrusion used in the invention.
Figure 2A:
FIG. 2a is a view similar to FIG. 2 illustrating an alternative form of collector strip extrusion.

Cross strip layers 15 of mastic are then applied, typically several feet apart and one-half inch wide, atop the exposed upper surfaces of blocks 12, 12 in between the perimeter strips 13,13. In FIG. 3 only two such strips of mastic 15 are shown. Then one or more flexible collector strips 16 are laid parallel to each other atop the strips of mastic. As best seen in FIG. 2, each collector strip 16 comprises a one-piece extrusion having a plurality of hollow tubes 18,18 extending parallel to each other and interconnected by web portions 19,19. Each strip 16 is extruded from EPDM (ethylene propylene diene monomer or terpolymer) elastomer or synthetic rubber having a saturated backbone, such as that sold under the trademark "Epcar" by B. F. Goodrich Chemical Company, Cleveland, Ohio. The collector strip in FIG. 2 is shown as comprising a strip approximately 4 inches in width and including eight tubes 18, but wider strips incorporating greater numbers of tubes or narrower strips having fewer tubes can be used, however, without departing from the invention. Irrespective of the number of tubes formed together to comprise the strip, the tubes are preferably spaced equally apart from each other. With eight strips 16 laid parallel to each other as shown in FIG. 3, 64 hollow tubes would then extend parallel to each other along the collector. As is evident in FIG. 2, each hollow tube is preferably somewhat elliptical in cross-section, being slightly wider than it is high. Such an arrangement offers the advantage over circular tubes of providing more radiation-receiving surface area, with some decrease in tube cross-sectional area and hence some reduction in fluid flow rate. However, collector strip using circular tubes, such as the strip shown in FIG. 2a is also eminently practical. Where flattened tubes are used as in FIG. 2, the inner dimensions of each tube may be ⅛ inch and 9/40 inch, for example. Even though the tubes are flattened in their relaxed state, each such tube is readily deformable at the ends of the strip, so that a round pipe nipple may fit tightly into the end of the tube to make a fluid-tight connection. The circular tubes of FIG. 2a may have an inside diameter of 3/16 inch and an outside diameter of 5/16 inch, for example. Such collector strips can be readily extruded in practically unlimited lengths, such as several hundred feet, and then rolled up so as to allow transportation in compact form to an installation site. The extruded collector strip can be readily cut to length using a knife or shears. It is desirable that each collector strip be adhered to the blocks 12 so that the tubing will lie flat, irrespective of the slope of the collector, and in spite of any memory in the tubing after it has been rolled up tending to prevent it from lying flat. However, as previously mentioned, EPDM rubber is difficult to cement, glue or otherwise bond to other materials, various adhesives which might provide a suitable mechanical bond being unsuitable because they tend to deteriorate EPDM rubber. Therefore, we provide one or several inwardly diverging or interlocking recesses along the lengths of the extruded collector strip. In FIG. 2 two such recesses are shown provided at 20,20 on the bottom side of strip 16, with pairs of projections 21,21 extending partway toward each other to provide a narrower opening for each recess than the width of the recess above the opening.

As strips 16 are successively laid down they eventually will cover all of the stripes of mastic 15. With no mastic exposed one can conveniently walk atop the strips 16 without fouling one's shoes and tracking mastic on the rooftop, and one can lay boards or the like atop the strips 16 to hold them in place while the mastic sets without fouling the boards with mastic. As a collector strip 16 is pressed down on a cross strip of mastic 15, the mastic oozes into a portion of the recess 20 to form an interlocking connection. Then after the mastic sets, the interlocking character of the mastic within the recess securely holds the collector strip atop the blocks 12, even though the mastic does not itself adhesively bond with appreciable reliability to the EPDM rubber collector strip. Advantageously, however, such adhering of the collector strips to the blocks 12 is not completely permanent, in the sense that a collector strip 16 can be deliberately removed, for replacement or repair if that should become necessary, by merely pulling the strip 16 upwardly, whereupon the strip temporarily deflects so that mastic portions may emerge from the recesses. Such removal of the collector strip does not damage the strip. While the strip of FIG. 2 incorporates two inwardly-diverging recesses on its lower side, more (or fewer) such recesses can be provided, it generally being desirable that wider strips having a larger number of tubes use more such recesses.

The top of the collector is formed by one or more transparent or translucent panels 22 spaced above the EPDM collector strips by the side and end rails 13. The upper panel or panels preferably comprise a fiberglass impregnated acrylic panel, such as the Sun-Lite Premium (trademark) or Sun-Lite Regular (trademark) fiberglass-reinforced polyester sheets sold by Kalwall Corporation of Manchester, N.H. As well as providing better insulating than glass, the fiberglass impregnated acrylic is comparatively unbreakable, and being flexible, it may be readily rolled up for transportation to an installation site. The acrylic is available in 50-foot rolls four or five feet wide, so that a single piece taken from such a roll can be used for the entire top of collectors of many different sizes. However, plural separate pieces of such acrylic may be butted together and joined by an overlying strip (e.g. 4-inch wide) of the same acrylic, such a strip being shown at 31 in FIG. 3. Strip 31 may be glued to the abutted pieces 22 with an acrylic solvent glue, much as Type No. HYPO RH 200 sold by Gaunt Industries, Chicago, Ill.

In order to fixedly space panel 22 a fixed distance above the collector strips 16,16 despite the flexibility of the panel 22, a plurality of small plastic posts 23,23 are cemented to the underside of each panel 22, so that the lower ends of the posts may rest on various of the collector strips 16.

In accordance with an important feature of the invention, each edge of panel 22 is secured atop the collector by means of a respective one-piece flexible PDM rubber extrusion 24, the installed cross-section of which is readily evident in FIG. 1. Extrusion 24 will be seen to comprise a main body portion having two leg portions 24a,24b which are shown extending generally perpendicularly to each other after extrusion 24 has been installed, so that the extrusion surrounds and covers the upper edges of the collector adjacent the perimeter. Upper arm portion 24 has a thin recess 24c into which each edge of panel 22 extends and is seated. The lower edge of arm 24a is shown provided with dovetail or interlocking recesses 24d on its lower side, so that mastic applied atop the rail members 13 will run into such recesses, and thereby hold extrusion leg 24a and the panel 22 edge firmly atop each side rail member 13. The portion of arm 24a below recess 24c may be nailed or tacked atop rail 13 or an equivalent wooden rail, if desired, since the upper part of arm 24a can be bent back to allow such nailing.

The depending leg portion 24b of each extrusion piece 24 is similarly shown provided with dovetail or interlocking recesses 24e on its inner side, so that the extrusion may be firmly fastened to each side rail 13, to the sides of the blocks 12 around the perimeter of the collector, and in most installations, to the roof surface 10. In some applications, such as where blocks 12 have greater thickness than that shown in FIG. 1, the depending leg of each extrusion piece 24 will merely extend down the side of the block and not be fastened to the roof surface per se. If desired, as well as using adhesive, one can nail leg 24b onto a wooden strip used in lieu of strip 13 and/or nail leg 24 to the roof. Importantly, since the depending leg 24b of the extrusion may be readily bent at any one of its recesses 24e, the extrusion may be used to construct divers collectors having different spacings between their upper panels 22 and their collector strips 16. When used to make prefabricated collectors having rigid frames, the depending leg portion of extrusion 24 can be bent underneath and fastened to the bottom of the frame.

Extrusion 24 is provided with an upper recess 24f. After installation an extruded locking key strip 25 is inserted into each recess 24f along the entire length of such recess, thereby forcing the upper portion of the arm 24a of each extrusion 24 tightly against the panel 22 edge seated in the slot 24c. Each piece of extrusion 24 preferably extends along all or a portion of a single side of the collector, with the ends of separate pieces of extrusion 24 simply butted together (mitred, if desired) at the corners and along the sides, if necessary, of the collector, and sealed at the butt joints with a black rubber sealant such as Type 101 made by 3M Co., Minneapolis, Minn.

Figure 5:
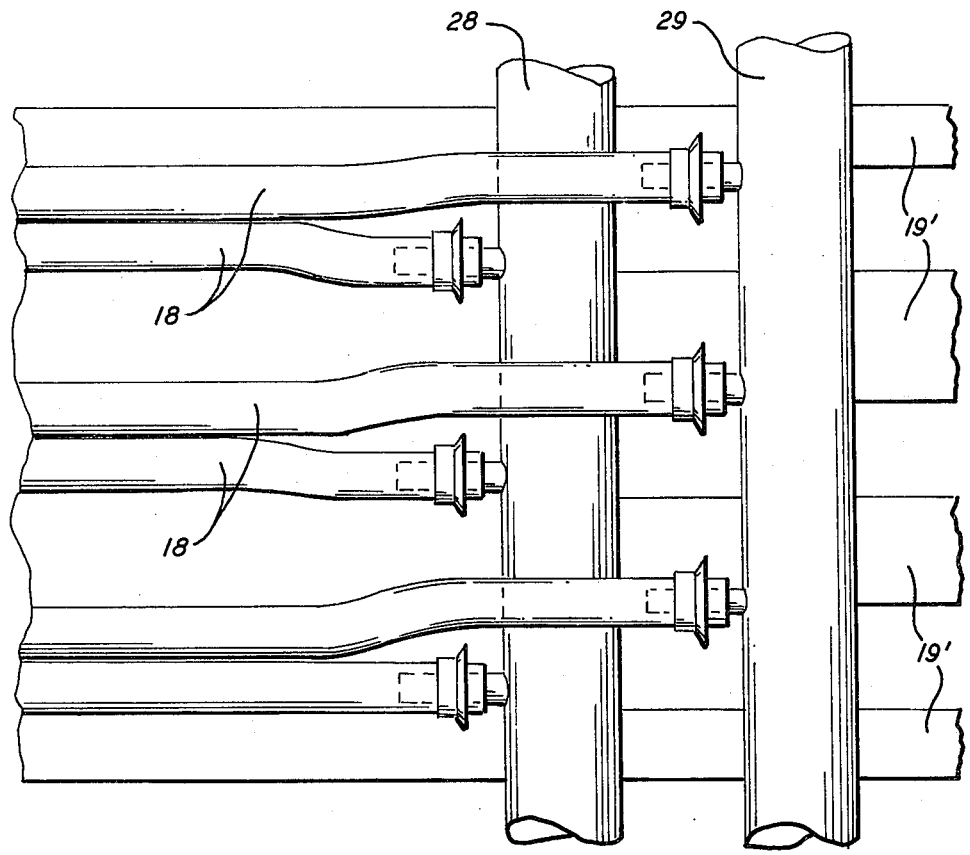
FIG. 5 is a top view illustrating tubing connections made at the other end of the flexible tubing mats.

Though not shown in FIG. 3, at one end of the collector the tube pairs of each strip 16 are interconnected by small U-shaped pieces of copper or plastic tubing 26,26 as shown in FIG. 4, so that water flowing into the collector through one tube exits from the collector through an adjacent tube. Because the tubes of each pair lie close to each other and heat transfer can occur between each pair, a fairly even or uniform temperature is maintained throughout the collector, tending to prevent temperature extremes in the collector strips 16. At the other end of the collector, as shown in FIG. 5, one tube of each pair is connected to an inlet header or manifold 28, while the other tube of each pair is connected to an outlet header or manifold 29. Manifolds 28 and 29 may be formed of any suitable material, such as copper, another metal, plastic, or rubber, each manifold being shown provided with a plurality of nipples which extend into the tubes of strips 16 and are clamped therein by simple rubber tubing clamps. Manifolds 28 and 29 extend in conventional fashion to fluid circulation equipment (not shown), such as downwardly through holes bored in the roof.

Figure 2B:
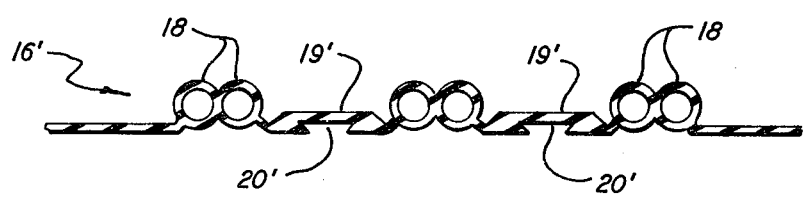
FIG. 2b is a view similar to FIGS. 2 and 2a illustrating yet another form of collector strip extrusion.

The collector tubing strip illustrated in FIG. 5 is assumed to be an alternative type also illustrated in FIG. 2b wherein the tubes are not spaced evenly apart, but it will be apparent that the tubes of the collector strips shown in FIGS. 2 and 2a can readily be connected to headers in similar fashion. In FIG. 5 the tubes are shown torn free from intermediate web portions 19' along a short length of the strip near the header, and each pair of tubes 18,18 shown torn apart near their ends to facilitate connection to the headers. As is more clearly seen in FIG. 2b the extruded collector strip 16' thereshown comprises pairs of tubes 18',18' butted together, with intermediate web portions 19' having inwardly-diverging recesses 20' extending along their bottom sides to affix the strip in a manner which will now be apparent.

Figure 6A:
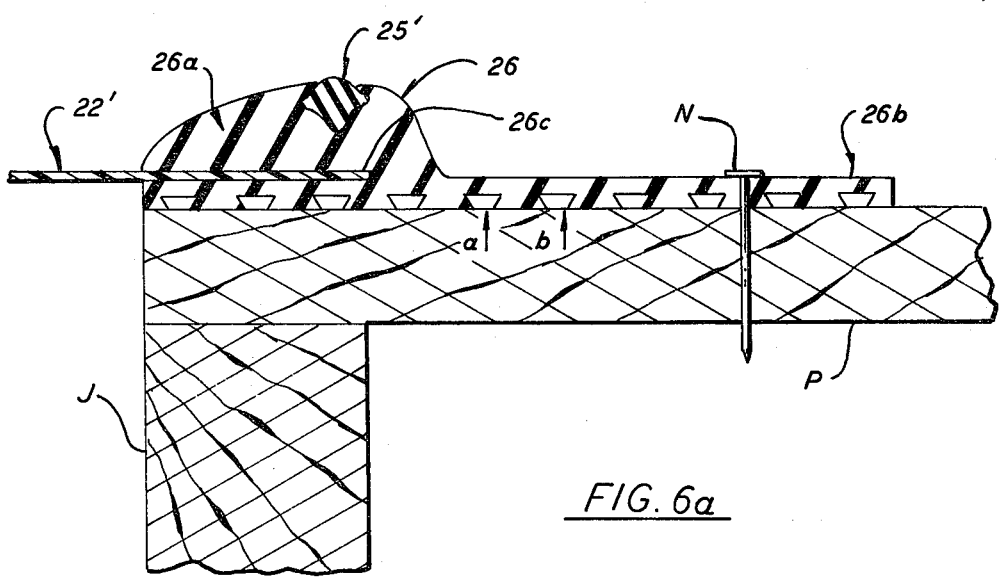
FIG. 6a is a cross-section elevational view similar to FIG. 1 illustrating an alternative form of sealing extrusion.

FIG. 6a illustrates an alternative form of sealing extrusion 26 particularly adapted for installation of solar panels on a flat roof, i.e. without a raised edge, such as in new buildings. For example, several roof joists, only one of which is shown at J, may frame the edges of a rectangular roof opening over which solar glazing 22' extends. Extrusion 26 is shown lying flat atop conventional roofing plywood P, being adhered thereto by mastic (not shown) which engages the inwardly-diverging recesses shown on the bottom side of the extrusion. The extrusion may be nailed to the plywood sheeting as well as being adhesively secured thereto, if desired, as indicated by roofing nail N. Extrusion 26 includes a recess 26c in which the edge of glazing panel 22' seats, and key 25' inserted in the extrusion then forces the upper lip 26a of the extrusion down against the panel 22'. Extrusion 26 will be seen to be identical to extrusion 24 of FIG. 1, except that its leg portions on opposite sides of the key recess extend generally parallel to each other rather than perpendicularly. The extrusion 26 also can readily be used, however, to cover a raised edge in the manner of extrusion 24 in FIG. 1. It will be apparent in FIG. 6a that if plywood P were absent leg 26b could be readily bent to extend downwardly against the side of member J, with such bending merely tending to collapse or close the recesses shown at a and b. Thus the inwardly-diverging recesses perform two functions, i.e. they enable reliable mechanical bending to be made, and they allow the extrusion to be readily bent to conform to varied applications.

FIG. 6b illustrates a form of extrusion 27 which is very useful when plural solar chambers are arranged side-by-side. Wooden member 28 is assumed to separate two such side-by-side solar chambers, one of which is covered by glazing panel 22a and the other of which is covered by glazing panel 22b, the two panels seating in respective recesses in extrusion 27 as shown, and key strips 25a and 25b being inserted to lock the panels in place. Inwardly-diverging recesses shown provided on the bottom of extrusion 27 affix the extrusion to member 28, and to battens or strips 29,29 shown nailed to member 28 to increase the width of its upper surface and thereby more tightly hold extrusion 27. Such battens will be unnecessary in some applications. Extrusion 27 can be nailed as well as adhesively secured to member 28, as by means of the nail shown at N.

While the improved solar collector has been shown including both the improved solar collector strips and novel extrusions, it will be apparent that the collector strips shown each could be used in solar collectors having other forms of sealing means, and that the extrusions 24,26 and 27 could be used in solar collectors having other forms of fluid-circulating tubing.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawings shall be interpreted as illustrative and not in a limiting sense.

The embodiments of the invention in which an exclusive property or privilege is claimed are defined as follows:

1. In a solar collector, the improvement comprising:
   (a) at least one fluid-conducting strip of flexible synthetic rubber having an undersurface opposite a radiation-receiving surface, and comprising
      i. a plurality of spaced parallel hollow tube portions, ii. a plurality of web portions joining adjacent pairs of said tube portions, and iii. a plurality of deflectable projections on the undersurface of said strip defining a plurality of inwardly diverging recesses; and (b) a deposit of cement which does not substantially bond to said synthetic rubber disposed against the undersurface of said strip and within said recesses;

(c) whereby said strip is securable to a base by said cement and is removable by pulling the strip away from the base so that the cement emerges from the recesses.

2. A solar collector according to claim 1 wherein said synthetic rubber is of EPDM material.

3. A solar collector according to claim 1 wherein the inside configuration of said hollow tube portions is non-circular.

4. A solar collector according to claim 1 wherein said web portions are longitudinally severable.

5. A solar collector according to claim 1 wherein said deflectable projections are in extended pairs and extend toward each other from respective adjacent hollow tube portions.

6. A solar collector according to claim 5 wherein the cement deposit is in spaced strips arranged transverse to the extended pairs of deflectable projections.

7. In a solar collector, the improvement comprising:
(a) a plurality of flexible fluid-conducting strips of EPDM synthetic rubber having an undersurface and an opposite radiation-receiving surface, each strip comprising
i. a plurality of equally spaced parallel hollow tube portions of non-circular cross-section,
ii. a plurality of longitudinally severable extended web portions joining adjacent pairs of said tube portions, and
iii. a plurality of extended deflectable projections on the undersurface of said strip in pairs extending toward each other from adjacent tube portions and defining a plurality of inwardly diverging recesses; and (b) a deposit of cement which does not substantially bond to said synthetic rubber disposed in spaced strips against the undersurfaces of said fluid-conducting strips and within said recesses;

(c) whereby said fluid-conducting strips are securable to a base by said cement and are removable by pulling said strips away from the base so that the cement emerges from the recesses.

8. In a solar collector having edges across which is disposed a translucent panel, the improvement comprising:
(a) at least one extrusion assembly of flexible synthetic rubber for sealing the edges of the collector comprising
i. first and second legs joining each other and having an undersurface,
ii. said first leg defining means for accepting an edge of said panel,
iii. a plurality of deflectable projections on the undersurface of the first and second legs defining a plurality of inwardly diverging recesses; and (b) a deposit of cement which does not substantially bond to synthetic rubber disposed against the undersurface of said first and second legs and within said inwardly diverging recesses;

(c) whereby said extrusion assembly is securable to a base by said cement and is removable by pulling the assembly away from the base so that the cement emerges from the inwardly diverging recesses.

9. A solar collector according to claim 8 wherein said first and second legs are substantially perpendicular.

10. A solar collector according to claim 8 wherein said first and second legs are substantially parallel.

11. A solar collector according to claim 8 wherein said extrusion assembly is of EPDM synthetic rubber.

12. A solar collector according to claim 8 wherein said first and second legs adjoin each other adjacent the first recess, said means on the first leg for accepting an edge of said panel being a second recess, and a key strip removably insertable in said first recess to compress said edge of said panel in said second recess.

13. A solar collector according to claim 12 wherein said extrusion assembly includes a third recess extending into said second leg to accept an edge of a panel.

14. A solar collector according to claim 13 wherein said extrusion assembly includes a fourth recess extending parallel to said first recess, and a second key strip is removably insertable into said fourth recess.

15. In a solar collector assembly wherein a plurality of rigid members form raised edges around the perimeter of a base surface and a translucent panel extends across said edges, the improvement comprising
(a) at least one fluid-conducting strip of flexible synthetic rubber having an undersurface opposite a radiation-receiving surface, and comprising
i. a plurality of spaced parallel hollow tube portions,
ii. a plurality of longitudinally severable web portions joining adjacent pairs of said tube portions, and
iii. a plurality of first deflectable projections on the undersurface of said strip defining a plurality of first inwardly diverging recesses; and (b) a first deposit of cement which does not substantially bond to said synthetic rubber disposed against the undersurface of said strip and within said first recesses;

(c) whereby said strip is securable to the base surface by said cement and is removable by pulling the strip away from the base so that the cement emerges from the first recesses;

(d) at least one extrusion assembly of flexible synthetic rubber for sealing the edges of the collector comprising
i. first and second legs joining each other adjacent a first recess and having an undersurface,
ii. said first leg defining a second recess for accepting an edge of said panel,
iii. a plurality of second deflectable projections on the undersurface of the first and second legs defining a plurality of second inwardly diverging recesses; and (e) a second deposit of cement which does not substantially bond to synthetic rubber disposed against the undersurface of said first and second legs and within said second inwardly diverging recesses; and (f) a key strip removably insertable in said first recess to compress said edge of said panel in said second recess;

(g) whereby said extrusion assembly is securable to the base surface by said cement and is removable by pulling the assembly away from the base so that the cement emerges from the second inwardly diverging recesses.

16. A method of removably applying to a base surface a fluid-conducting strip and an edge-sealing extrusion, each of said strip and extrusion having an undersurface and being of flexible synthetic rubber, which comprises:
 (a) forming a plurality of pairs of deflectable projections on the undersurface of each of the strips and extrusions with each pair defining an inwardly diverging recess,
 (b) disposing between and against the base surface and the strip and extrusion undersurfaces respective deposits of cement which does not substantially bond to said synthetic rubber,
 (c) forcing said cement into the recesses defined by said projections, and
 (d) setting said cement to secure the strip and extrusion removably to the base surface so that upon pulling therefrom the projections deflect and the cement emerges from the recesses.

17. A method according to claim 16 wherein the base surface is a surface of a solar collector.

18. A method according to claim 16 wherein the synthetic rubber is of EPDM material.

19. A method according to claim 16 wherein the deflectable projections are in extended pairs.

20. A method according to claim 16 wherein cement is applied first to the base surface and then the strip and extrusion undersurfaces are applied to the cement.

21. A method of removably applying to a base surface a fluid-conducting strip having an undersurface and being of flexible synthetic rubber, which comprises:
 (a) forming a plurality of pairs of deflectable projections on the undersurface of the strip with each pair defining an inwardly diverging recess,
 (b) disposing between and against the base surface and the strip undersurface a deposit of cement which does not substantially bond to said synthetic rubber,
 (c) forcing said cement into the recesses defined by said projections, and
 (d) setting said cement to secure the strip removably to the base surface so that upon pulling therefrom the projections deflect and the cement emerges from the recesses.

22. A method according to claim 21 wherein the base surface is a surface of a solar collector.

23. A method according to claim 21 wherein the synthetic rubber is of EPDM material.

24. A method according to claim 21 wherein the deflectable projections are in extended pairs.

25. A method according to claim 21 wherein the cement deposit is in spaced strips arranged transverse to the extended pairs of deflectable projections.

26. A method according to claim 21 wherein the cement is applied first to the base surface and then the undersurface of the fluid-conducting strip is applied to the cement.

27. A method of removably applying to a base surface an edge-sealing extrusion having an undersurface and being of flexible synthetic rubber, which comprises:
 (a) forming a plurality of pairs of deflectable projections on the undersurface of the extrusion with each pair defining an inwardly diverging recess,
 (b) disposing between and against the base surface and the extrusion undersurface a deposit of cement which does not substantially bond to synthetic rubber,
 (c) forcing said cement into the recesses defined by said projections, and
 (d) setting said cement to secure the extrusion to the base surface so that upon pulling therefrom the projections deflect and the cement emerges from the recesses.

28. A method according to claim 27 wherein said base surface is a surface of a solar collector.

29. A method according to claim 27 wherein the synthetic rubber is of EPDM material.

30. A method according to claim 27 wherein the deflectable projections are in extended pairs.

31. A method according to claim 27 wherein the cement is applied first to the base surface and then the undersurface of the extrusion is applied to the cement.

* * * * *